United States Patent
Lee et al.

(10) Patent No.: US 8,031,682 B2
(45) Date of Patent: Oct. 4, 2011

(54) APPARATUS AND METHOD FOR AGGREGATING AND SWITCHING TRAFFIC IN SUBSCRIBER NETWORK

(75) Inventors: Hyoung Il Lee, Daejeon (KR); Jeong Hee Lee, Daejeon (KR); Bhum Cheol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1195 days.

(21) Appl. No.: 11/294,937

(22) Filed: Dec. 6, 2005

(65) Prior Publication Data
US 2006/0120393 A1 Jun. 8, 2006

(30) Foreign Application Priority Data

Dec. 7, 2004 (KR) .................. 10-2004-0102509
Apr. 22, 2005 (KR) .................. 10-2005-0033526

(51) Int. Cl.
*H04W 4/00* (2009.01)
(52) U.S. Cl. ......... 370/338; 370/231; 370/429; 370/432
(58) Field of Classification Search ............... 370/395.4, 370/338, 230, 231, 235, 420, 429, 432, 440, 370/468

See application file for complete search history.

(56) References Cited

U.S. PATENT DOCUMENTS 6,781,986 B1   8/2004   Sabaa et al.
2005/0249220 A1*  11/2005  Olsen et al. ............... 370/395.4

FOREIGN PATENT DOCUMENTS

JP   09-168016   6/1997
JP   2001-298477   10/2001
KR   2001-0045783   6/2001

OTHER PUBLICATIONS

"Gigabit Ethernet Switches Using a Shared Buffer Architecture," Michael V. Lau et al, IEEE Communications Magazine, Dec. 2003, pp. 76-84, © 2003 IEEE.
"The iSLIP Scheduling Algorithm for Input-Queued Switches," Nick McKeown, IEEE/ACM Transactions on Networking, vol. 7, No. 2, Apr. 1999, pp. 188-201, © 1999 IEEE.

* cited by examiner

*Primary Examiner* — Wayne Cai
(74) *Attorney, Agent, or Firm* — Ladas & Parry LLP (57) ABSTRACT

An apparatus for aggregating and switching traffic in a broadband subscriber network and methods of processing upstream and downstream traffic are provided. The apparatus includes: an upstream traffic processing unit which stores a plurality of packets received from a plurality of downlinks with respect to each subscriber link, and transmits the packets stored with respect to each subscriber link to uplinks through scheduling; and a downstream traffic processing unit which broadcasts a packet received from the uplinks to the subscriber links via a broadcast bus connected to the respective subscriber links and determines with respect to each subscriber link whether to transmit the packet to subscriber links. It is possible to efficiently aggregate, switch, and broadcast subscriber traffic in a broadband subscriber network in which upstream traffic and downstream traffic are asymmetric.

15 Claims, 8 Drawing Sheets

APPARATUS AND METHOD FOR AGGREGATING AND SWITCHING TRAFFIC IN SUBSCRIBER NETWORK

CROSS-REFERENCE TO RELATED PATENT APPLICATION

This application claims the benefit of Korean Patent Application Nos. 10-2004-0102509, filed on Dec. 7, 2004, and 10-2005-0033526, filed on Apr. 22, 2005, in the Korean Intellectual Property Office, the disclosures of which are incorporated herein in their entirety by reference.

BACKGROUND OF THE INVENTION

1. Field of the Invention

The present invention relates to an apparatus and method for aggregating and switching traffic in a subscriber network, and more particularly, to an apparatus and method for aggregating and switching traffic in a subscriber network, which can efficiently aggregate and switch subscriber traffic with various bandwidths in a broadband subscriber network where upstream traffic and downstream traffic are asymmetric.

2. Description of the Related Art

Major increases in Internet data transmission speeds have opened the way for the commercialization of various multimedia services, such as digital broadcasts, video-on-demand (VOD) services, video phone services, and video conferencing services. In order to provide, for example, Voice over Internet protocol (VoIP) services, broadcasting services, and other multimedia services together with existing data services, it is important to differentiate real-time traffic from other traffic and provide bandwidths to a plurality of subscribers while guaranteeing a high quality of service (QoS).

Conventional subscriber network technologies using telephone lines, such as xDSL and HFC, are only suitable for providing a bandwidth of 1-10 Mbps. Thus, it is necessary to develop new subscriber network technology that can provide higher bandwidths.

Recently, subscriber network technologies using Ethernet have been developed. These Ethernet-based subscriber network technologies are mainly used for establishing local area network (LAN) in businesses, and systems or devices implementing them are provided at lower costs than other Layer 2-related systems.

In addition, an increasing number of subscriber networks have been established using conventional Ethernet switches that are generally used to establish a fast Ethernet-based LAN. However, conventional Ethernet switches have been designed to serve a LAN and thus may not be suitable for processing subscriber traffic.

Subscriber traffic has a non-uniform distribution of destinations. In a subscriber network, in particular, almost no inter-subscriber traffic exists. In other words, a plurality of subscribers belonging to a subscriber network, unlike a plurality of users connected to a LAN, do not incur traffic thereamong because a subscriber network is not provided for enabling a plurality of subscribers therein to communicate but is provided for connecting the subscribers to an upper network. Accordingly, in a subscriber network, there are two important traffic flows, i.e., upstream traffic, which is traffic from a plurality of subscribers to an uplink, and downstream traffic, which is traffic from the uplink to the subscribers.

In addition, in a subscriber network, upstream traffic and downstream traffic are asymmetric, that is, the amount of downstream traffic is much larger than the amount of upstream traffic. It is important to process traffic that needs to be multicast, such as broadcast services. Even though the amount of upstream traffic is much smaller than the amount of downstream traffic, it is also important to transmit traffic in consideration of fairness among a plurality of subscribers who compete for the bandwidth of one uplink and the priority levels of the subscribers.

Conventional Ethernet switches used to establish an Ethernet-based subscriber network cannot fully reflect the general characteristics of a subscriber network described above. In other words, conventional Ethernet switches are designed to be suitable for a LAN with uniform and symmetric user traffic and thus may not be suitable for efficiently processing traffic in a subscriber network with asymmetric traffic.

For example, in order to form an Ethernet switch having N ports, an N×N switch fabric configuration is needed. However, given that there is little inter-subscriber traffic in a subscriber network, a switching capacity of only about (N×1+1×N) is needed to accommodate N subscribers.

In addition, conventional Ethernet switches that are currently available commercially are designed to have a shared buffer or shared bus architecture. An example of a conventional Ethernet switch having a shared buffer or shared bus architecture has been presented by Michael V. Lan, et al., ["Gigabit Ethernet Switches Using a Shared Buffer Architecture", IEEE Communications Magazine Vol. 41, Issue 12, pp. 76-84, December 2003].

As a number of ports in a conventional Ethernet switch having a shared buffer or shared bus architecture increases, an operating speed of a shared buffer or shared bus must increase accordingly, and this requirement makes it almost impossible to accommodate a considerable number of subscribers using a single device as specified by Nick McKeown [The iSLIP Scheduling Algorithm for Input-Queued Switches, IEEE/ACM Transactions on Networking, Vol. 7, pp. 188-201, April 1999].

In addition, in order to process multicast traffic, conventional Ethernet switches must duplicate a packet as many times as there are destinations to which the packet needs to be transmitted. Accordingly, in a case where multicast traffic having a high priority level, such as broadcast traffic, occupies most of the bandwidths available to a conventional Ethernet switch, the amount of resources that other traffic having lower priority levels can use may decrease considerably, and thus, the quality of data transmission may considerably deteriorate.

SUMMARY OF THE INVENTION

The present invention provides an apparatus for aggregating and switching traffic in a subscriber network which can enhance buffering efficiency in a broadband subscriber network where upstream traffic and downstream traffic are asymmetric and which can efficiently aggregate, switch, and broadcast subscriber traffic to a plurality of subscribers in the broadband subscriber network by using a single device even when a transmission speed of an uplink is different from a transmission speed of a downlink.

The present invention also provides a method of aggregating and switching traffic in a subscriber network in which buffering efficiency can be enhanced in a broadband subscriber network where upstream traffic and downstream traffic are asymmetric, and subscriber traffic can be efficiently aggregated, switched, and broadcast to a plurality of subscribers in the broadband subscriber network by using a single device even when a transmission speed of an uplink is different from a transmission speed of a downlink.

According to an aspect of the present invention, there is provided an apparatus for aggregating and switching traffic in a subscriber network. The apparatus includes: an upstream traffic processing unit which stores a plurality of packets received from a plurality of downlinks with respect to each subscriber link, and transmits the packets stored with respect to each subscriber link to uplinks through scheduling; and a downstream traffic processing unit which broadcasts a packet received from the uplinks to the subscriber links via a broadcast bus connected to the respective subscriber links and determines with respect to each subscriber link whether to transmit the packet to subscriber links.

According to another aspect of the present invention, there is provided a method of processing upstream traffic performed by an apparatus for aggregating and switching traffic in a subscriber network. The method includes: receiving a plurality of packets from a plurality of downlinks, which are subscriber links, and storing the received packets with respect to each subscriber link; and transmitting the stored packets through scheduling with respect to each subscriber link.

According to another aspect of the present invention, there is provided a method of processing downstream traffic performed by an apparatus for aggregating and switching traffic in a subscriber network. The method includes: broadcasting a packet received from an uplinks to a plurality of subscriber links via a broadcast bus connected to the respective subscriber links; and allowing the subscriber links to determine whether to transmit the packets that they receive.

According to another aspect of the present invention, there is provided a method of processing inter-subscriber traffic performed by an apparatus for aggregating and switching traffic in a subscriber network. The method includes: receiving a plurality of packets from a plurality of downlinks, which are subscriber links, and storing the packets with respect to each subscriber link; transmitting the packets to an uplinks through scheduling with respect to each subscriber link; determining whether each of the packets is destined for any of the subscriber links based on header information of the transmitted packets; broadcasting the packets to the subscriber links via a broadcast bus connected to the respective subscriber links if each of the packets is destined for any of the subscriber links; and allowing the subscriber links to determine whether to transmit the packets that they receive.

Accordingly, it is possible to efficiently aggregate, switch, and broadcast subscriber traffic in a broadband subscriber network where upstream traffic and downstream traffic are asymmetric.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings in which exemplary embodiments of the invention are shown.

Figure 1:
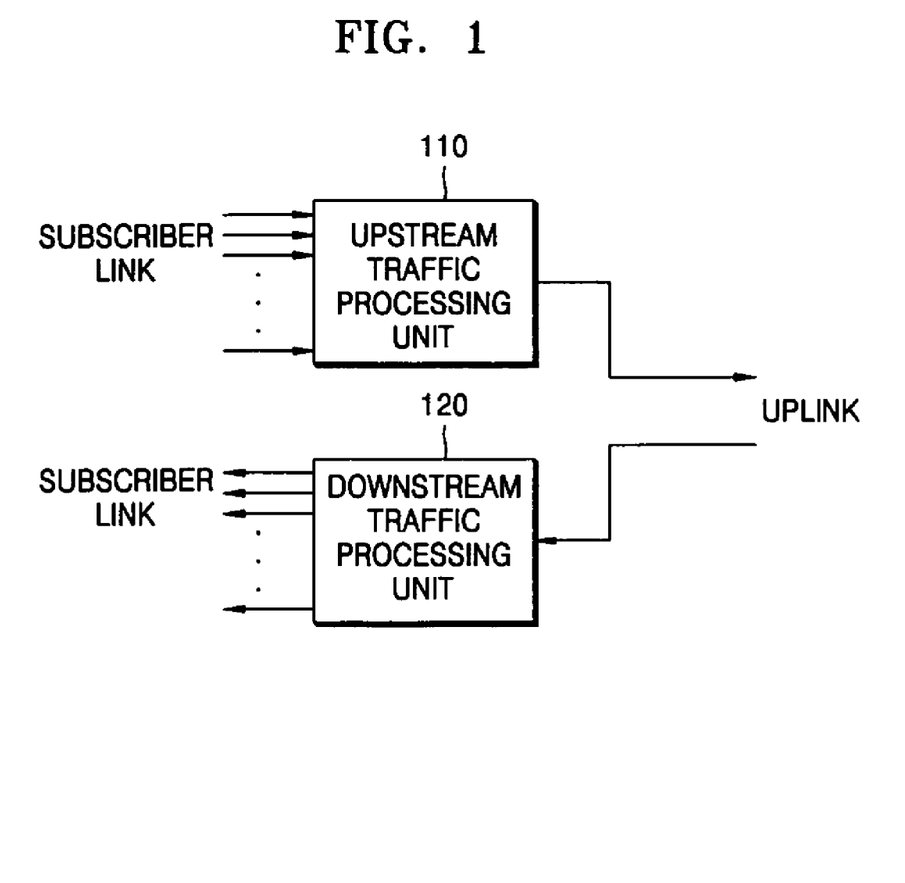
FIG. 1 is a block diagram of an apparatus for aggregating and switching traffic in a subscriber network according to an exemplary embodiment of the present invention.

FIG. 1 is a block diagram of an apparatus for aggregating and switching traffic in a subscriber network according to an exemplary embodiment of the present invention. Referring to FIG. 1, the apparatus includes an upstream traffic processing unit 110 and a downstream traffic processing unit 120. The apparatus classifies subscriber traffic into upstream traffic or downstream traffic. In the present embodiment, it is assumed that there is nearly no inter-subscriber traffic.

A process of processing upstream traffic will now be described in detail.

The apparatus of FIG. 1 processes upstream traffic and downstream traffic separately. In other words, the apparatus processes upstream traffic using the upstream traffic processing unit 110 and processes downstream traffic using the downstream traffic processing unit 120. Upstream traffic is a group of two or more packets flowing from a plurality of subscribers to one or more uplinks. In this type of traffic flow, an aggregation function rather than a symmetric switching function is necessary, and it is important to guarantee fairness among the subscribers in terms of bandwidth access.

Figure 2A:
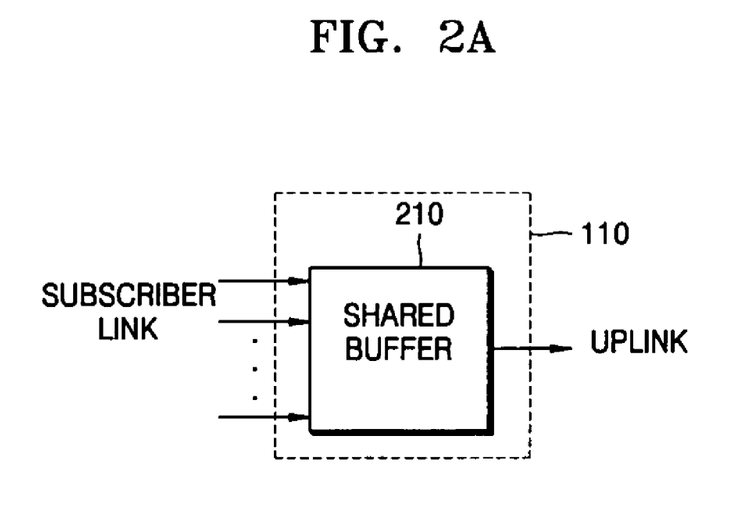
FIGS. 2A through 2C are block diagrams of embodiments of an upstream traffic processing unit of FIG. 1.
Figure 2B:
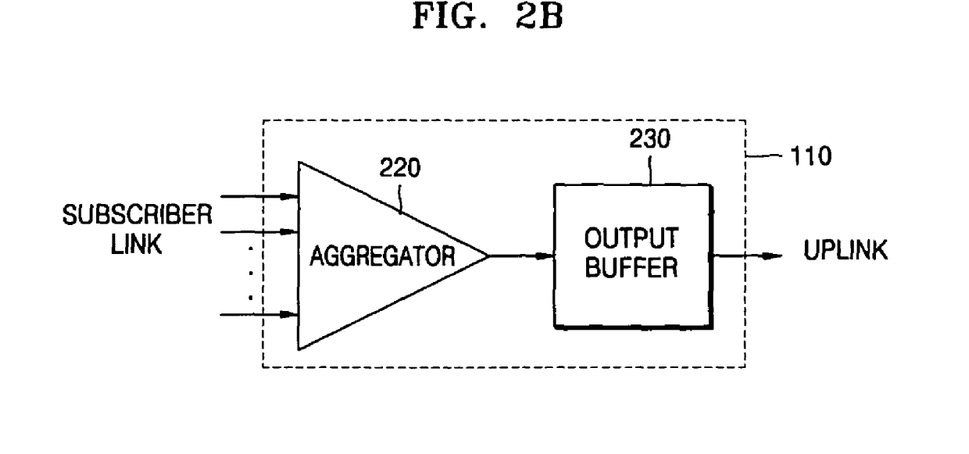
Figure 2C:
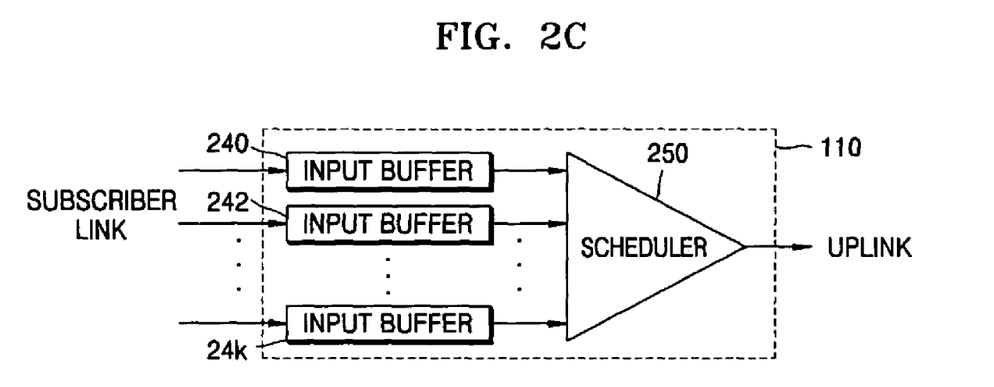

FIGS. 2A through 2C are block diagrams of embodiments of the upstream traffic processing unit 110 of FIG. 1.

Referring to FIG. 2A, a plurality of subscriber links may be connected to an uplink by using a shared buffer 210. The number of packets processed by the shared buffer 210 can be reduced by separately processing upstream traffic and downstream traffic. However, as the number of subscribers increases, the operating speed of the shared buffer 210 must increase accordingly. Accordingly, the shared buffer 210 is likely to become a bottleneck if the apparatus of FIG. 1 is expanded.

Referring to FIG. 2B, a second embodiment of the upstream traffic processing unit 110 includes an aggregator or multiplexer 220 and an output buffer 230. Since the upstream traffic processing unit 110 does not include an input buffer, the multiplexer 220 and the output buffer 230 must operate at a high speed at which they can handle all of the bandwidths of several subscriber links.

As illustrated in FIG. 2C, in the present invention includes a scheduler 250, which is provided for connecting a plurality of subscriber links to an uplink. Referring to FIG. 2C, input buffers 240, 242, and 24k store a plurality of packets received from respective subscriber links. The scheduler 250 determines in what order the packets stored in the input buffers 240, 242, and 24$k$ are to be transmitted to the uplink. An operating speed of the scheduler 250 is determined to be equal to an operating speed of the uplink. Thus, there is no need to manually increase an operating speed of the upstream traffic processing unit 110 in accordance with an increase in the number of subscriber links, and the upstream traffic processing unit 110 can be implemented and expanded easily.

A process of processing downstream traffic will now be described in detail.

Downstream traffic is a group of packets flowing from an uplink to a plurality of subscribers. In order to receive a service, such as a broadcast service without performance degradation, it is important to be able to multicast such traffic.

FIGS. 3A through 3D are block diagrams of embodiments of the downstream traffic processing unit 120 of FIG. 1.

Figure 3A:
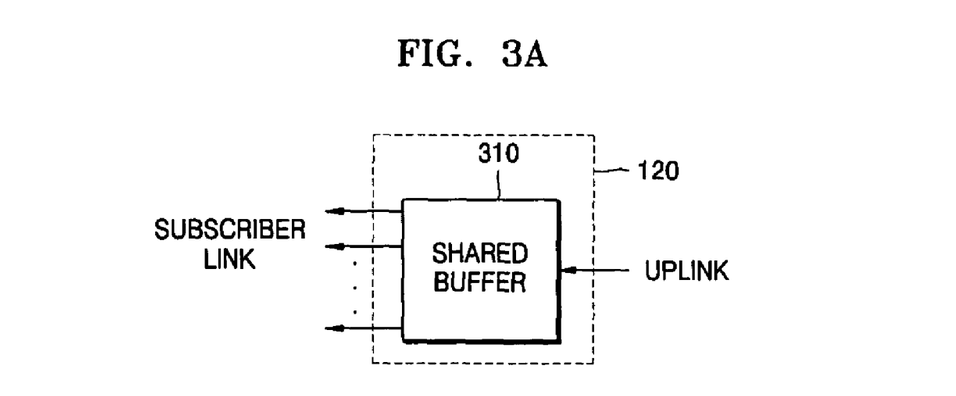
FIGS. 3A through 3D are block diagrams of embodiments of a downstream traffic processing unit of FIG. 1.
Figure 3B:
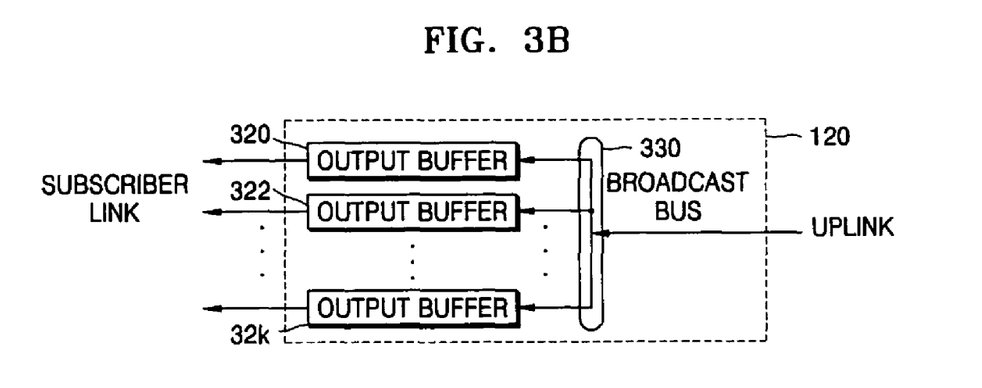
Figure 3C:
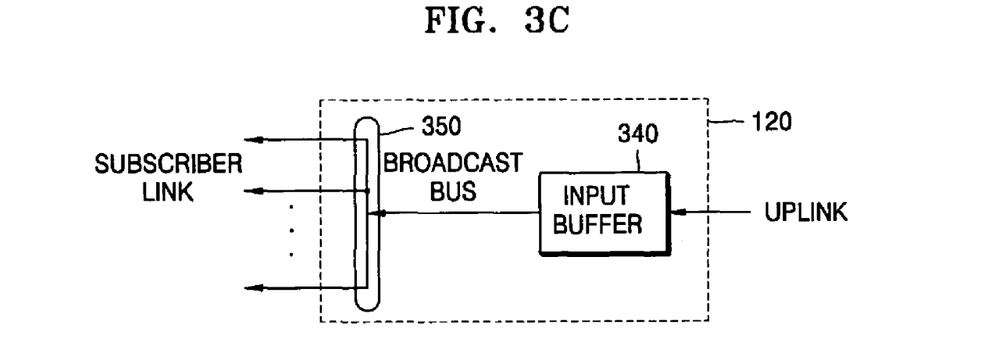
Figure 3D:
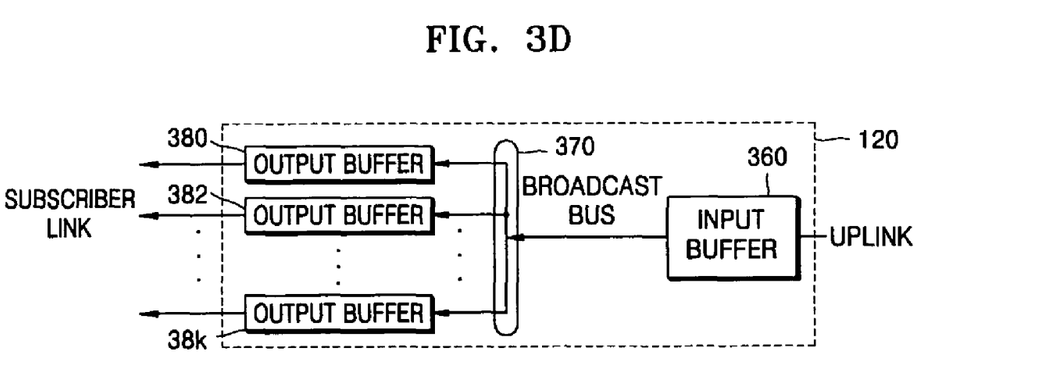

Referring to FIG. 3A, a shared buffer 310 is used to transmit a plurality of packets received from an uplink to a plurality of subscriber links. The downstream traffic processing unit 120, like the upstream traffic processing unit 110 of FIG. 2A, can reduce the number of packets that can be processed more considerably than an Ethernet switch, which processes both upstream traffic and downstream traffic using a shared buffer, by the shared buffer 310 separately processing upstream traffic from downstream traffic. However, the operating speed of the shared buffer 310 must increase in accordance with an increase in the number of subscribers because the shared buffer 31 must simultaneously multicast a packet received from the uplink to a plurality of subscriber links. Therefore, the shared buffer 310 is likely to become a bottleneck if the apparatus of FIG. 1 is expanded. In the present invention, in order to solve this problem and multicast traffic without performance degradation, broadcast buses 330, 350, and 370 of FIGS. 3B, 3C, and 3D are used. The broadcast buses 330, 350, and 370 transmit a packet received from the uplink to each of a plurality of subscriber links connected thereto. In other words, the broadcast buses 330, 350, and 370 transmit the packet received from the uplink to the respective subscriber links, and then, the respective subscriber links decide whether to transmit or abandon the packet transmitted by the broadcast buses 330, 350, and 370 depending on whether the destinations of the packets transmitted by the broadcast buses 330, 350, and 370 are connected to their respective links.

If the speed of the uplink is higher than the speed of each of the subscriber links connected to the downstream traffic processing unit 120, the downstream traffic processing unit 120 may need one or more buffers. In general, the speed of an uplink is higher than the speed of a subscriber link. Thus, various examples of the downstream traffic processing unit 120 including one or more buffers are illustrated in FIGS. 3B, 3C, and 3D.

Referring to FIG. 3B, another embodiment of a downstream traffic processing unit 120 includes output buffers 320, 322, and 32$k$ and the broadcast bus 330. Each of a plurality of packets received from an uplink are indiscriminately transmitted to the broadcast bus 330 and then stored in the output buffers 320, 322, and 32$k$. Thereafter, the packets stored in the output buffers 320, 322, and 32$k$ are transmitted to a plurality of subscriber links. It is easy to control the operation of the downstream traffic processing unit 120 shown in FIG. 3B because the only thing that has to be done related to the controlling of the operation of the downstream traffic processing unit 120 is for the subscriber links to check out destinations of the packets output from the output buffers 320, 322, and 32$k$. However, the downstream traffic processing unit 120 of FIG. 3B is inefficient in terms of buffering efficiency because the packets to be multicast need to be copied to each of the output buffers 320, 322, and 32$k$.

Referring to FIG. 3C, the downstream traffic processing unit 120 includes an input buffer 340 and the broadcast bus 350. A plurality of packets received from an uplink are stored in the input buffer 340 and are then transmitted to a plurality of subscriber links via the broadcast bus 350. Each of the subscriber links examines the destinations of the packets received from the input buffer 340 and decides whether to transmit or abandon the packets received from the input buffer 340. The downstream traffic processing unit 120 of FIG. 3C provides a high buffering efficiency. However, the downstream traffic processing unit 120 of FIG. 3C needs to determine when to transmit the packets stored in the input buffer 340 to the broadcast bus 350 through computation. A problem of the downstream traffic processing unit 120 of FIG. 3C will be described later in further detail with reference to FIG. 4.

Referring to FIG. 3D, the downstream traffic processing unit 120 includes an input buffer 360 and output buffers 380, 382, and 38$k$. The downstream traffic processing unit 120 of FIG. 3D is a combination of the downstream traffic processing unit 120 of FIG. 3B and the downstream traffic processing unit 120 of FIG. 3C. Thus, it is possible to control buffering efficiency and complexity of the downstream traffic processing unit 120 of FIG. 3D by varying the size of input buffers and output buffers installed therein.

If buffering efficiency is considered to be of paramount importance, the downstream traffic processing unit 120 may be designed to include the downstream input buffers 340 and 360 as illustrated in FIGS. 3C and 3D, respectively, in which case, if a transmission speed of the broadcast bus 350 or 370 is different from a transmission speed of a plurality of subscriber links connected to the downstream traffic processing unit 120, it is necessary to determine an order in which a plurality of packets received from the uplink are to be transmitted to the broadcast bus 350 or 370.

For example, it is assumed that a broadcast bus operates ten times faster than a subscriber link. Then, after transmitting a packet to the subscriber link, the broadcast bus cannot transmit another packet to the subscriber link for a predetermined time duration corresponding to a difference between its operating speed and an operating speed of the subscriber link. In other words, if a plurality of packets transmitted by the broadcast bus have the same length and it takes the broadcast bus a predetermined amount of time t to transmit each of the packets to the subscriber link, the broadcast bus must be prevented from transmitting a current packet to the subscriber link within 10t after transmitting a previous packet to the subscriber link.

Figure 4:
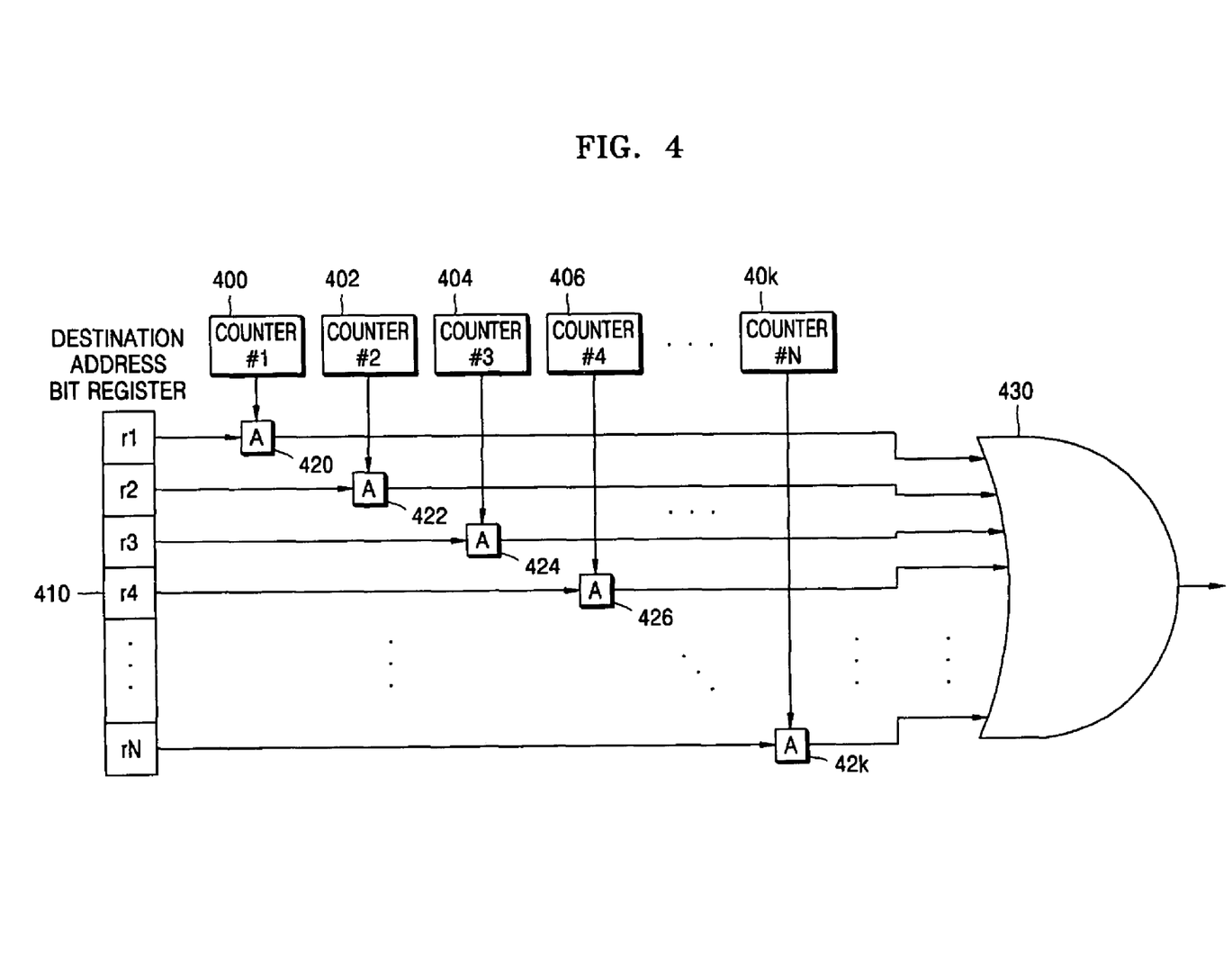
FIG. 4 is a block diagram of a broadcast bus unit that controls a transmission of a packet from an input buffer to a broadcast bus.

FIG. 4 is a block diagram of a broadcast bus unit that controls transmission of packets from an input buffer to a broadcast bus. Referring to FIG. 4, the broadcast bus unit includes a destination address bit register 410, a plurality of counters 400, 402, 404, 406, and 40$k$ provided for respective subscriber links, and a packet transmission determination unit including a plurality of logic operators, i.e., AND circuits 420, 422, 424, 426, and 42$k$ and an OR circuit 430.

The counters 400, 402, 404, 406, and 40$k$ have maximum packet transmission delay values corresponding to differences between an operating speed of a broadcast bus and operating speeds of the respective subscriber links. Therefore, once a first packet is transmitted to one of the subscriber links, a counter corresponding to this subscriber link is initialized to its maximum packet transmission delay value. Thereafter, the counter corresponding to the subscriber link to which the first packet has been transmitted, gradually reduces its count value from its maximum packet transmission delay value over time. If the count value of the counter corresponding to the subscriber link to which the first packet has been transmitted becomes 0, the counter corresponding to the subscriber link to which the first packet has been transmitted outputs a value of 0 to indicate that a second packet can be transmitted to the subscriber link to which the first packet has been transmitted. However, if the count value of the counter corresponding to the subscriber link to which the first packet has been transmitted is not 0, the counter outputs a value of 1 to indicate that the second packet waits in an input buffer instead of being transmitted to the subscriber link to which the first packet has been transmitted.

When a packet to be transmitted to the broadcast bus arrives at the input buffer, the destination address bit register 410 converts the address of a destination subscriber link of the packet to be transmitted to the broadcast bus into a bitstream and stores the bitstream.

The packet transmission determination unit performs an AND operation on a plurality of bits of the address of the destination subscriber link of the packet to be transmitted to the broadcast bus and the output values of the respective counters 400, 402, 404, 406, and 40$k$ by using the respective AND circuits 420, 422, 424, 426, and 42$k$. Thereafter, the packet transmission determination unit applies the AND operation results to the OR circuit 430. Then, the OR circuit 430 performs an OR operation on the AND operation results provided by the packet determination unit. If the OR operation result is determined to be 0, the packet transmission determination unit decides to transmit the packet to be transmitted to the broadcast bus. However, if the OR operation result is determined to be 1, the packet transmission determination unit forces the packet to be transmitted to the broadcast bus wait in the input buffer without transmitting the packet to be transmitted to the broadcast bus.

If the packet to be transmitted via the broadcast bus is a packet to be multicast but can be transmitted only to some of the subscriber links, the packet transmission determination unit transmits the packet to be transmitted via the broadcast bus to the subscriber links that can transmit the packet to be transmitted via the broadcast bus and applies the addresses of the rest of the subscriber links to the destination address bit register 410 so that they are forced to wait in a downstream input buffer. The counters that are determined based on the value of the destination address bit register 410 to correspond to the subscriber links to which the packet to be transmitted to the broadcast bus has been transmitted are initialized to their respective maximum values and vary their respective output values to 1.

For example, if the counters 400, 402, 404, 406, and 40$k$ output a value of 0101 and a value of the destination address bit register 410 is 1010, a value of 0000 is obtained as a result of performing a bitwise AND operation on the output value of the counters 400, 402, 406, and 40$k$ and the value of the destination address bit register 410, and thus a corresponding packet is considered transmittable. If the counters 400, 402, 404, 406, and 40$k$ output a value of 1100 and a value of the destination address bit register 410 is 1010, a value of 1000 is obtained as a result of performing a bitwise AND operation on the output value of the counters 400, 402, 404, 406, and 40$k$ and the value of the destination address bit register 410, and thus a corresponding packet is not considered transmittable.

Referring to FIG. 3D, the downstream traffic processing unit 120 includes downstream output buffers 380, 382, and 38$k$ and thus does not need to perform complicated computation to determine whether or not to transmit a packet. The downstream traffic processing unit 120 uses a flow control approach. In the flow control approach, the downstream traffic processing unit 120 receive packets arbitrarily transmitted from an uplink and sends a signal to an input buffer 360 to prevent the input buffer 360 from transmitting packets to subscriber links any longer if the downstream output buffers 380, 382, and 38$k$ store more packets than they are supposed to store.

Figure 5:
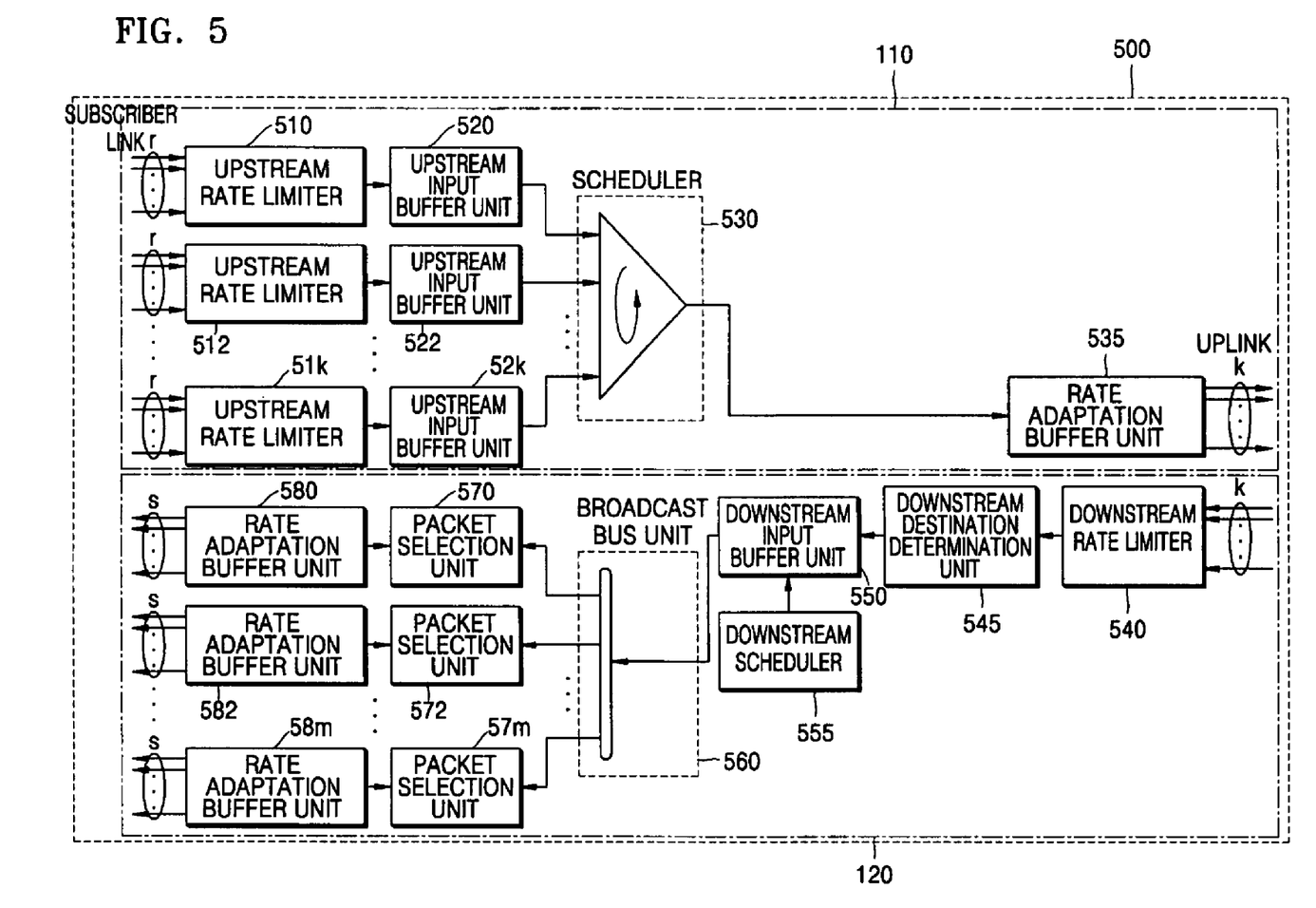
FIG. 5 is a block diagram of an input buffer-type apparatus for aggregating and switching traffic in a subscriber network according to an exemplary embodiment of the present invention.

FIG. 5 is a block diagram of an input buffer-type apparatus 500 for aggregating and switching traffic in a subscriber network according to an exemplary embodiment of the present invention. Referring to FIG. 5, the apparatus 500 processes upstream traffic and downstream traffic separately and includes an upstream traffic processing unit 110 and a downstream traffic processing unit 120. The upstream traffic processing unit 110, which processes upstream traffic, includes upstream rate limiters 510, 512, and 51$k$, upstream input buffers 520, 522, and 52$k$, a scheduler 530, and an upstream rate adaptation buffer unit 535. The downstream traffic processing unit 120, which processes downstream traffic, includes a downstream rate limiter 540, a downstream destination determination unit 545, a downstream input buffer 550, a downstream scheduler 555, a broadcast bus unit 560, packet selection units 570, 572, and 57$k$, and downstream rate adaptation buffer units 580, 582, and 58$k$.

An operation of the upstream traffic processing unit 110 will now be described in detail.

When a current packet arrives via a subscriber link, the upstream rate limiters 510, 512, and 51$k$ classify the current packet as belonging to a predetermined traffic flow group using packet header information of the current packet and then restrict the current packet to a predetermined bandwidth allotted to the traffic flow group to which the current packet belongs. In other words, if more packets are received and classified as belonging to the predetermined traffic flow group than the bandwidth allotted to the predetermined traffic flow group can handle, the upstream rate limiters 510, 512, and 51$k$ abandon or discard the current packet. Otherwise, the upstream rate limiters 510, 512, and 51$k$ store the current packet in the upstream input buffers 520, 522, and 52$k$.

A plurality of packets stored in the upstream input buffers 520, 522, and 52$k$ are transmitted in an order determined by the scheduler 530. The scheduler 530 determines an order in which the packets stored in the upstream input buffers 520, 522, and 52$k$ are to be transmitted according to priority levels of the packets stored in the upstream input buffers 520, 522, and 52$k$ and fairness among a plurality of subscribers.

The upstream rate adaptation buffer unit 535 temporarily stores packets therein in order to compensate for a difference between an internal transmission speed of the apparatus 500 and a transmission speed of one or more uplinks connected thereto.

The operation of the downstream traffic processing unit 120 will now be described in detail.

The downstream rate limiter 540 classifies a current packet as belonging to a predetermined traffic flow group using packet header information of the current packet and restricts the current packet to a bandwidth allotted to the predetermined traffic flow group to which the current packet belongs. In other words, if more packets are received and classified as belonging to the predetermined traffic flow group than the bandwidth allotted to the predetermined traffic flow group can handle, the downstream rate limiter 540 abandons the current packet.

The downstream destination determination unit 545 checks out destination MAC addresses of a plurality of packets transmitted by the downstream rate limiter 540, determines destination ports (or subscriber links) to which the packets are to be transmitted, and attaches information regarding the determined destination ports to the respective packets as tags. If the packets are to be multicast, the downstream destination determination unit 545 attaches a tag designating a plurality of destinations to each of the packets.

Thereafter, the packets to which the tags indicating the respective destination ports are attached by the downstream destination determination unit 545 are stored in the downstream input buffer unit 550. The downstream scheduler 555 examines the destination addresses of the packets stored in the downstream input buffer unit 550, determines which of the packets stored in the downstream input buffer unit 550 are transmittable to the respective subscriber links by using the structure illustrated in FIG. 4, determines an order in which the packets determined to be transmittable to the respective subscriber links are to be transmitted, and transmits the packets determined to be transmittable to the respective subscriber links in the determined order. The packets output from the downstream input buffer unit 550 are simultaneously transmitted to the packet selection units 570, 572, and 57*k* of the respective subscriber links via the broadcast bus unit 560.

In other words, the broadcast bus unit 560 broadcasts a plurality of packets input thereto to all of a plurality of subscriber links. The packet selection units 570, 572, and 57*m* of the subscriber links that receive the packets broadcast the packets via the broadcast bus unit 560, examine the tags of the received packets, determine whether the received packets are destined for their respective subscriber links, allow transmission of only the packets that are destined for their respective subscriber links, and abandon the rest of the received packets. The packets selected by the packet selection units 570, 572, and 57*m* are stored in the respective downstream rate adaptation buffer units 580, 582, and 58*m*.

The downstream rate adaptation buffer unit 580, 582, and 58*m* temporarily store the packets selected by the respective packet selection units 570, 572, and 57*m* in order to compensate for a difference between the internal transmission speed of the apparatus 500 and the transmission speed of one or more subscriber links connected thereto.

Figure 6:
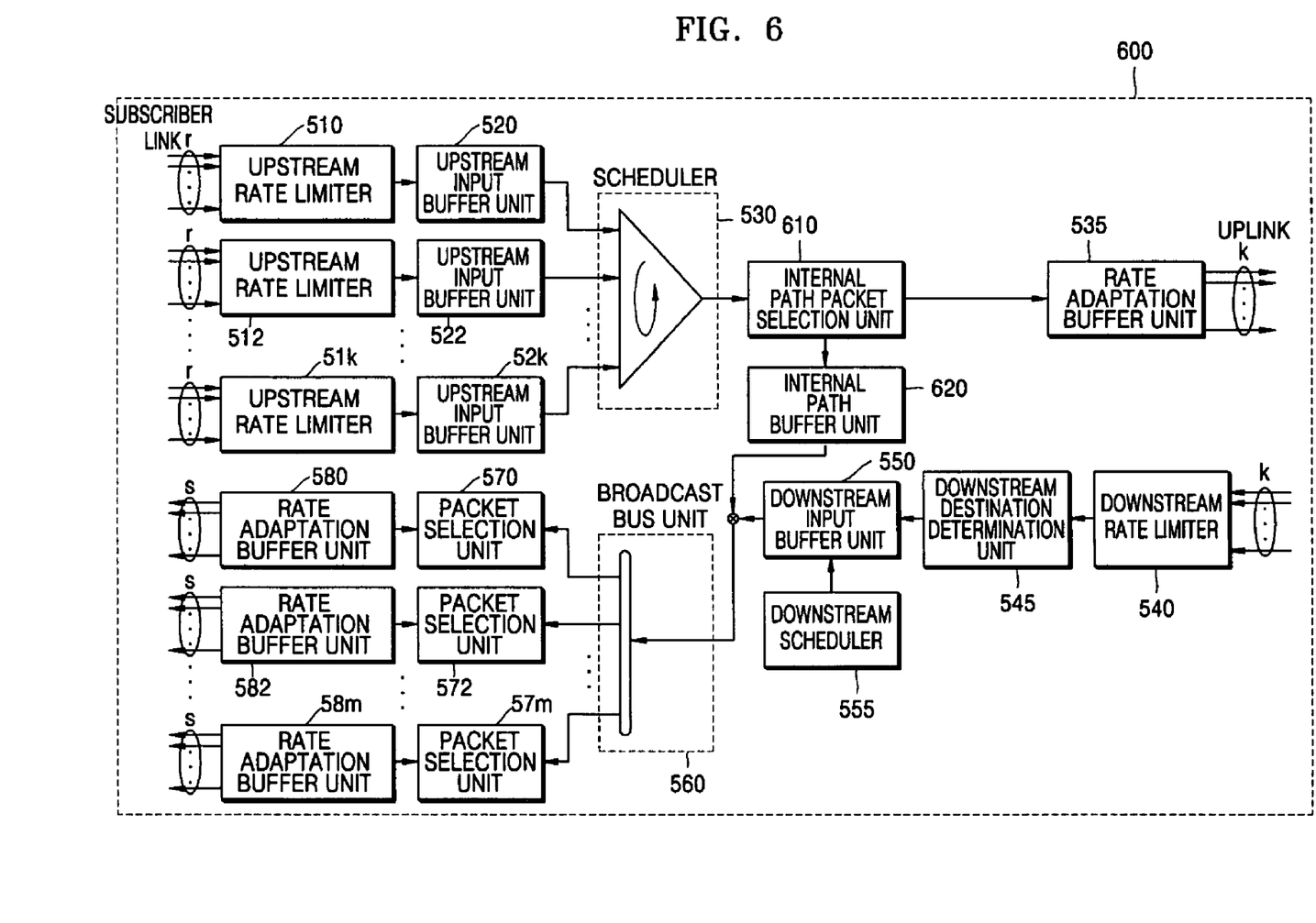
FIG. 6 is a block diagram of an apparatus for aggregating and switching traffic in a subscriber network according to an exemplary embodiment of the present invention in which an internal path is established for processing inter-subscriber traffic.

FIG. 6 is a block diagram of an apparatus 600 for aggregating and switching traffic in a subscriber network according to an exemplary embodiment of the present invention in which an internal path is established for processing inter-subscriber traffic. Referring to FIG. 6, the apparatus 600 has the same structure as the apparatus 500 of FIG. 5 except that it further includes an internal path packet selection unit 610 and an internal path buffer unit 620 located between an upstream rate adaptation buffer unit 535 and a broadcast bus unit 560.

In detail, the internal path packet selection unit 610 uses the same routing table used by a downstream destination determination unit 545. When a packet arrives at the internal path packet selection unit 610 via a scheduler 530, the internal path packet selection unit 610 searches the routing table for a destination address of the packet. If there is a match for the destination address of the packet in the routing table, the internal path packet selection unit 610 attaches a tag indicating the packet's destination address to the packet and then stores the packet in the internal path buffer unit 620. The packet stored in the internal path buffer unit 620 is transmitted to each of a plurality of subscribers via the broadcast bus unit 560 along downstream traffic.

Figure 7:
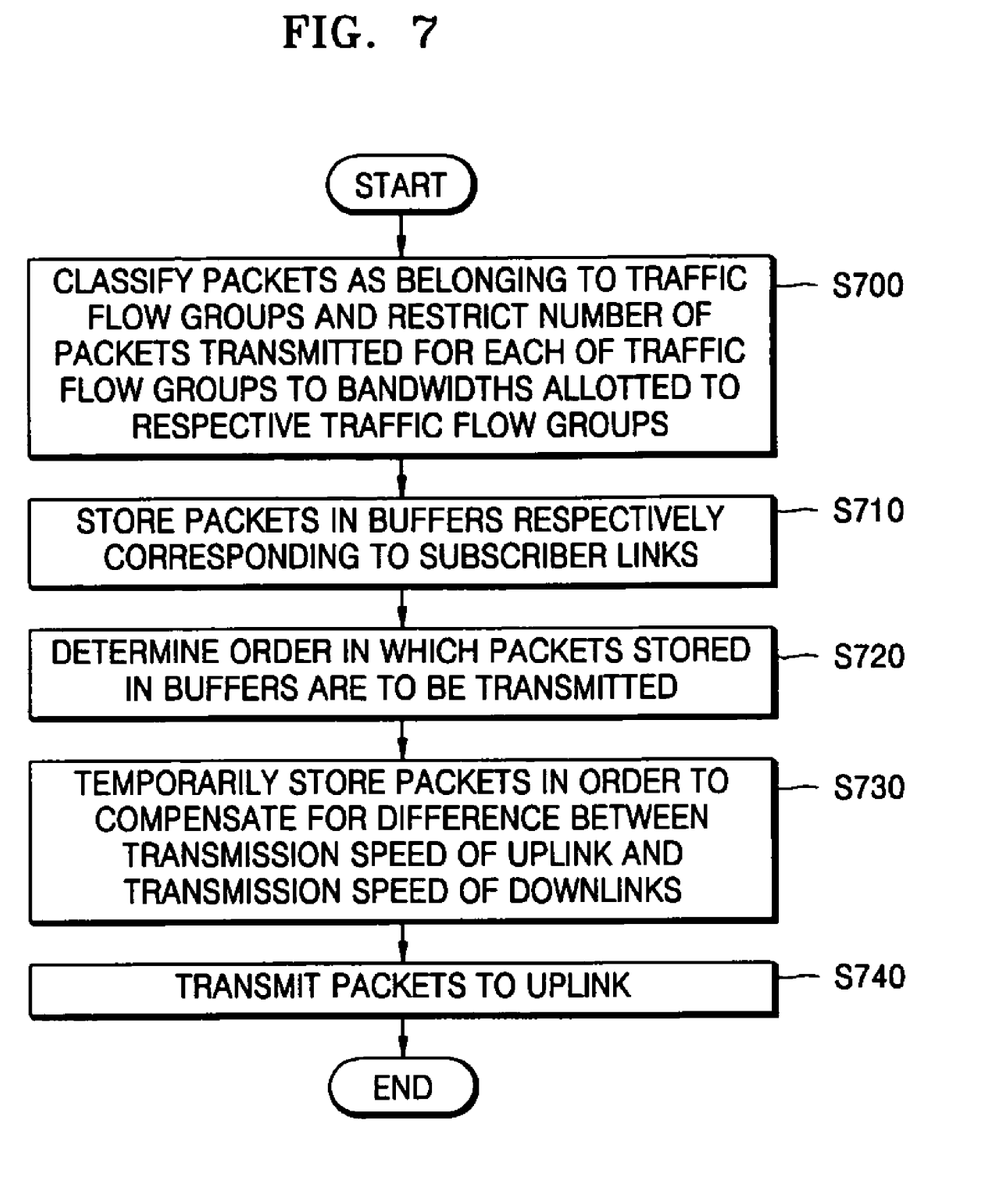
FIG. 7 is a flowchart illustrating an upstream processing method performed by an apparatus for aggregating and switching upstream traffic in a subscriber network according to an exemplary embodiment of the present invention.

FIG. 7 is a flowchart illustrating a method of processing upstream traffic performed by an apparatus for aggregating and switching upstream traffic in a subscriber network according to an exemplary embodiment of the present invention. Referring to FIG. 7, in operation S700, the apparatus classifies a plurality of packets received from a plurality of downlinks (i.e., subscriber links) as belonging to a plurality of traffic flow groups and determines whether to abandon the packets according to bandwidths allotted in advance to the traffic flow groups to which the received packets belong.

In operation S710, the apparatus further classifies the packets as belonging to a plurality of subscriber link groups and stores the subscriber link groups in respective buffers. In operation S720, the apparatus determines an order in which the packets are to be output, and outputs the packets in the determined order. In operation S730, since a transmission speed of an uplink and a transmission speed of the downlinks are generally different, the apparatus temporarily stores the packets therein in order to compensate for a difference between the transmission speeds of the uplink and the downlinks. In operation S740, the apparatus transmits the packets to the uplink.

Figure 8:
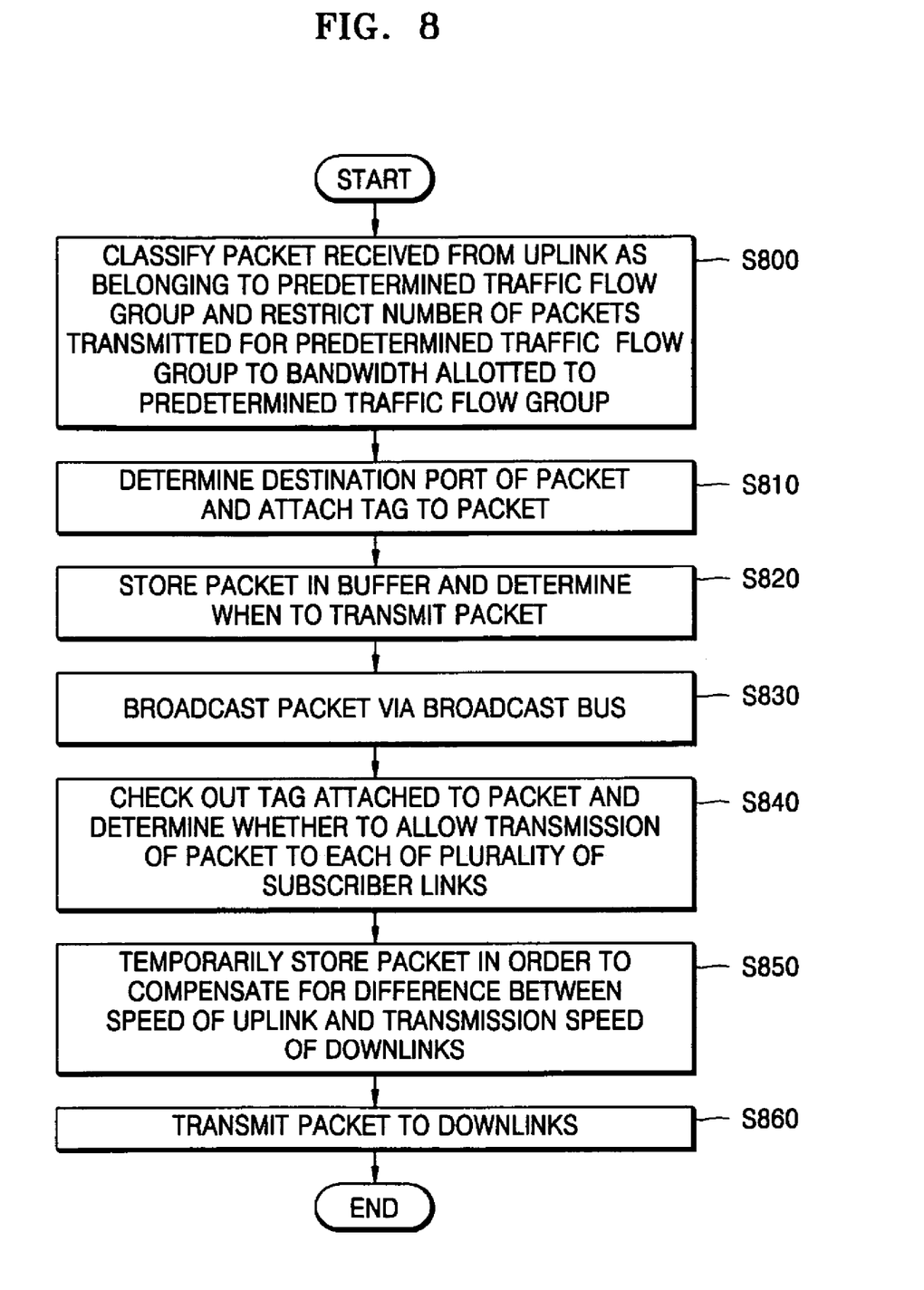
FIG. 8 is a flowchart explaining a downstream processing method performed by an apparatus for aggregating and switching downstream traffic in a subscriber network according to an exemplary embodiment of the present invention.

FIG. 8 is a flowchart explaining a method of processing downstream traffic performed by an apparatus for aggregating and switching downstream traffic in a subscriber network according to an exemplary embodiment of the present invention. Referring to FIG. 8, in operation S800, the apparatus classifies a packet received from an uplink as belonging to a predetermined traffic flow group and determines whether to abandon the packet in consideration of a bandwidth allotted in advance to the traffic flow group into which the packet is classified.

In operation S810, if the packet is not abandoned in operation S800, the apparatus determines an address corresponding to a destination subscriber link of the packet using packet header information of the packet and attaches a tag to the packet indicating the determined address. In operation S820, the apparatus stores the packet in a buffer and then determines when to transmit the packet through scheduling.

In operation S830, since a transmission speed of a broadcast bus via which a packet is transmitted to all of a plurality of subscriber links is different from a transmission speed of each of the subscriber links, the apparatus broadcasts the packet stored in the buffer via the broadcast bus according to a difference between the transmission speed of the broadcast bus and the transmission speed of the subscriber links.

In operation S840, the apparatus examines the tag of the packet output via the broadcast bus and then determines whether to transmit the packet to each of the subscriber links. In operation S850, the apparatus temporarily stores the packet therein in order to compensate for a difference between a transmission speed of the uplink and a transmission speed of the downlinks. In operation S860, the apparatus transmits the packet to the downlinks.

In an apparatus for aggregating and switching traffic in a subscriber network according to the present invention, operating speeds of a scheduler and a broadcast buffer unit do not change but are fixed regardless of whether the number of subscriber links increases. The operating speeds of the scheduler and the broadcast bus unit change only when the speed or number of uplinks connected thereto increases because, in the present invention, an input buffer is used to process upstream traffic. Therefore, the operating speed of the apparatus for aggregating and switching traffic in a subscriber network according to the present invention does not increase even when the number of subscriber links increases, and thus the apparatus for aggregating and switching traffic in a subscriber network according to the present invention can accommodate more subscriber links than in the prior art.

In addition, the apparatus for aggregating and switching traffic in a subscriber network according to the present invention does not suffer from the problem of head-of-line (HOL)

blocking that is apparent in a conventional input-buffered switch, and it is easy to control the apparatus for aggregating and switching traffic in a subscriber network according to the present invention because the apparatus for aggregating and switching traffic in a subscriber network according to the present invention sets different paths for upstream traffic and downstream traffic.

Moreover, in the apparatus for aggregating and switching traffic in a subscriber network according to the present invention, an upstream input buffer unit and a downstream input buffer unit do not cause required memory bandwidths to increase even when the number of subscriber links increases because the apparatus for aggregating and switching traffic in a subscriber network according to the present invention uses a distributed input buffering method. In addition, since the apparatus for aggregating and switching traffic in a subscriber network according to the present invention uses an input buffering method when processing downstream traffic, it can increase buffering efficiency by storing multicast traffic therein only one time.

The apparatus for aggregating and switching traffic in a subscriber network according to the present invention can more easily and more efficiently guarantee quality of service (QoS) than a conventional Ethernet switch having a shared buffer architecture. A conventional Ethernet switch having a shared buffer architecture requires an overall packet processing operation to be carried out in a centralized manner together with read and write operations performed on a shared buffer and to be designed in consideration of traffic for all possible combinations of input and output ports. For example, if a conventional Ethernet switch includes N input ports and N output ports, it must be able to manage logic buffers and guarantee QoS for N ×N combinations of the N input ports and the N output ports.

However, the apparatus for aggregating and switching traffic in a subscriber network according to the present invention only needs at least 2N logic buffers. If the upstream input buffer unit manages more than one subscriber link, the number of logic buffers needed by the apparatus for aggregating and switching traffic in a subscriber network according to the present invention can be further reduced. In addition, in the apparatus for aggregating and switching traffic in a subscriber network according to the present invention, various functions, such as rate limitation and flow control, are carried out by different buffers in a decentralized manner, thus reducing the workload of each of the buffers. Therefore, it is possible to easily guarantee QoS.

In short, the apparatus for aggregating and switching traffic in a subscriber network according to the present invention can aggregate upstream traffic of a considerable number of subscriber links to more than one uplink according to fairness among the subscriber links and the priority levels of the subscriber links, can efficiently switch and broadcast downstream traffic to the subscriber links, and can increase buffering efficiency by using a downstream input buffering method. Accordingly, the apparatus for aggregating and switching traffic in a subscriber network according to the present invention can achieve a higher performance and a higher integration density and can provide more services to subscribers than a conventional Ethernet switch.

The switching capacity of the apparatus for aggregating and switching traffic in a subscriber network according to the present invention does not increase in accordance with the increase in the number of subscriber links but is restricted to the bandwidth of an uplink connected thereto. In addition, the workload of the apparatus for aggregating and switching traffic in a subscriber network according to the present invention related to the handling of input and output memory bandwidths and packets can be reduced by storing and processing the packets in a decentralized manner. Moreover, since downstream traffic is processed in a broadcast-and-select manner by a broadcast bus unit, it is possible to efficiently process multicast traffic.

The apparatus for aggregating and switching traffic in a subscriber network according to the present invention can increase buffering efficiency by using a downstream input buffer when there is downstream multicast traffic. Accordingly, it is possible to reduce the number of buffers required to store downstream traffic. In addition, in a case where there is a need to accommodate a plurality of subscribers, the number of buffers required for storing downstream traffic does not increase in accordance with the increase in the number of subscribers. Thus, it is possible to accommodate all of the subscribers by using a single device.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for aggregating and switching traffic in a subscriber network comprising:
   an upstream traffic processing unit which stores a plurality of packets received from a plurality of downlinks with respect to each subscriber link, and transmits the packets stored with respect to each subscriber link to uplinks through scheduling; and
   a downstream traffic processing unit which broadcasts a packet received from the uplinks to the subscriber links via a broadcast bus connected to the respective subscriber links and determines with respect to each subscriber link whether to transmit the packet to subscriber links,
   wherein the upstream traffic processing unit which stores the plurality of packets received from the plurality of downlinks with respect to each of the subscriber link and the downstream traffic processing unit which broadcasts the packet received from the uplinks to the subscriber links via the broadcast bus connected to the respective subscriber links are processed separately from each other and without having any head-of-line blocking, and
   an internal path packet selection unit which determines which of the subscriber links each of the packets transmitted by the upstream traffic processing unit is destined for based on header information of each of the transmitted packets; and
   an internal path buffer unit which stores each of the transmitted packets to transmit them to the downstream traffic processing unit later if each of the transmitted packets is destined for one of the subscriber link.

2. The apparatus of claim 1, wherein the upstream traffic processing unit comprises:
   an upstream input buffer unit which stores the packets from the downlinks with respect to each subscriber link; and
   a scheduler which determines an order in which the packets stored in the upstream input buffer unit are to be output.

3. The apparatus of claim 1, wherein the upstream traffic processing unit comprises an upstream rate limiter which classifies the packets received from the downlinks by traffic flows using header information of the received packets and determines whether to abandon the received packets according to bandwidths allotted to the respective traffic flows.

4. The apparatus of claim 1, wherein the upstream traffic processing unit comprises an upstream rate adaptation buffer unit which temporarily stores the packets received from the downlinks in order to compensate for a difference between transmission speed of the downlinks and transmission speed of the uplinks.

5. The apparatus of claim 1, wherein the downstream traffic processing unit comprises:
   a broadcast bus unit which broadcasts the packet received from the uplinks to the subscriber links via a broadcast bus connecting the uplinks and the respective subscriber links;
   a packet selection unit which determines whether to transmit the packet received from the uplinks to each of the subscriber links based on a destination subscriber link address of the packet received from the uplinks; and
   an upstream rate adaptation buffer unit which temporarily stores the packet received from the uplinks in order to compensate for a difference between transmission speed of the uplinks and transmission speed of the subscriber links.

6. The apparatus of claim 1, wherein the downstream traffic processing unit comprises:
   a downstream input buffer unit which stores the packet received from the uplinks;
   a broadcast bus unit which broadcasts the packet stored in the downstream input buffer unit to the subscriber links via a broadcast bus connecting the downstream input buffer unit and the respective subscriber links; and
   a packet selection unit which determines whether to transmit the packet received from the uplinks based on a destination subscriber link address of the packet received from the uplinks.

7. The apparatus of claim 6, wherein the broadcast bus unit controls the broadcasting of the packet received from the uplinks based on a difference between transmission speed of the broadcast buses and transmission speed of the subscriber links.

8. The apparatus of claim 6, wherein the broadcast bus unit comprises:
   a destination address bit register which stores a destination subscriber link address of the packet received from the uplinks as a bitstream;
   a counter which counts time intervals during which a packet is transmitted to the subscriber links; and
   a packet transmission determination unit which determines whether to broadcast the packet stored in the downstream input buffer unit to the subscriber links based on a bit value output by the destination address bit register for each of the subscriber links and a count value of the counter indicating whether it is time to transmit a packet to the subscriber links.

9. The apparatus of claim 6, wherein the downstream traffic processing unit further comprises a rate adaptation buffer unit which temporarily stores the packet broadcasted via the broadcast bus in order to compensate for a difference between transmission speed of the broadcast bus and transmission speed of the subscriber links.

10. The apparatus of claim 6, wherein the downstream traffic processing unit further comprises a downstream scheduler which determines the output order of the packet stored in the input buffer unit.

11. The apparatus of claim 1, wherein the downstream traffic processing unit comprises a downstream rate limiter which classifies the packet received from the uplinks by traffic flows based on header information of the received packet and determines whether to abandon the received packet according to a bandwidth allotted to the respective traffic flows.

12. The apparatus of claim 1, wherein the downstream traffic processing unit comprises a downstream destination determination unit which determines a destination subscriber link address of the packet received from the uplinks based on a destination address of the received packet.

13. A method of processing downstream traffic performed by an apparatus for aggregating and switching traffic in a subscriber network, the method comprising:
   broadcasting a packet received from uplinks to only a plurality of subscriber links via a broadcast bus connected to the respective subscriber links; and
   allowing the subscriber links to determine whether to transmit the packets that they receive,
   wherein the broadcasting of the packet received from the uplinks are processed separately and without having any head-of-line blocking from any upstream traffic,
   storing a destination subscriber link address of the packet received from the uplinks as a bitstream;
   counting time intervals during which a packet is transmitted to the subscriber links; and
   determining whether to broadcast the packet received from the uplinks based on a bit value output for each of the subscriber links and the counting result indicating whether it is time to transmit a packet to the subscriber links.

14. The method of claim 13 further comprising, before the broadcasting:
   classifying the packet received from the uplinks by traffic flows based on header information of the received packet and determining whether to abandon the received packet in consideration of a bandwidth allotted to the respective traffic flows; and
   storing the received packet if the received packet is determined not to be abandoned.

15. The method of claim 13 further comprising: temporarily storing the packet broadcast via the broadcast bus in order to compensate for a difference between transmission speed of the broadcast buses and transmission speed of the subscriber links.

* * * * *